(12) United States Patent
Asahi

(10) Patent No.: US 10,505,420 B2
(45) Date of Patent: Dec. 10, 2019

(54) METHOD OF MANUFACTURING ROTOR OF ROTARY ELECTRIC MACHINE

(71) Applicant: Honda Motor Co., Ltd., Tokyo (JP)

(72) Inventor: Atsushi Asahi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 202 days.

(21) Appl. No.: 15/586,280

(22) Filed: May 4, 2017

(65) Prior Publication Data

US 2017/0331338 A1 Nov. 16, 2017

(30) Foreign Application Priority Data

May 13, 2016 (JP) .................................. 2016-097175

(51) Int. Cl.
| | | |
|---|---|---|
| *H02K 1/32* | (2006.01) | |
| *H02K 1/27* | (2006.01) | |
| *H02K 15/03* | (2006.01) | |
| *H02K 21/14* | (2006.01) | |

(52) U.S. Cl.
CPC ............. *H02K 1/32* (2013.01); *H02K 1/2706* (2013.01); *H02K 1/2766* (2013.01); *H02K 15/03* (2013.01); *H02K 21/14* (2013.01); *Y10T 29/49012* (2015.01)

(58) Field of Classification Search
CPC ........ H02K 15/03; H02K 1/2706; H02K 1/32; H02K 21/14; H02K 1/2766; Y10T 29/49012
USPC .............................................. 310/55; 29/596
See application file for complete search history.

(56) References Cited

U.S. PATENT DOCUMENTS

| | | | | |
|---|---|---|---|---|
| 2008/0174200 A1* | 7/2008 | Okamoto | ............... | H02K 15/02 310/216.018 |
| 2014/0042834 A1* | 2/2014 | Asahi | ...................... | H02K 1/04 310/43 |
| 2014/0042854 A1* | 2/2014 | Asahi | ................... | H02K 1/2706 310/156.08 |
| 2016/0211719 A1* | 7/2016 | Hidaka | ............... | H02K 1/2733 |

FOREIGN PATENT DOCUMENTS

| | | |
|---|---|---|
| JP | 2007104782 | 4/2007 |
| JP | 2009232557 | 10/2009 |
| JP | 2011114987 | 6/2011 |
| JP | 2013017303 | 1/2013 |
| JP | 2014-057443 | 3/2014 |
| JP | 2015042123 | 3/2015 |

(Continued)

OTHER PUBLICATIONS

Office Action of China Counterpart Application, with English translation thereof, dated Nov. 1, 2018, pp. 1-19.

(Continued)

*Primary Examiner* — Alex W Mok
(74) *Attorney, Agent, or Firm* — JCIPRNET

(57) ABSTRACT

In a rotary electric machine that has excellent efficiency and light weight, a rotor (21) of a motor (23) includes a rotary shaft (24), a rotor core (61) that is fixed coaxially to the rotary shaft (24) and formed of electromagnetic steel, a first end plate (71) that is disposed to face a first end face (61*a*) of the rotor core (61), and a second end plate (72) that is disposed to face a second end face (61*b*) of the rotor core (61). The first end plate (71) and the second end plate (72) are formed of a bond magnet.

1 Claim, 13 Drawing Sheets

(56) References Cited

FOREIGN PATENT DOCUMENTS

| | | |
|---|---|---|
| WO | 2013017303 | 2/2013 |
| WO | 2015029387 | 3/2015 |

OTHER PUBLICATIONS

"Office Action of Japan Counterpart Application," with machine English translation thereof, dated Feb. 27, 2018, p. 1-p. 9.
"Office Action of China Counterpart Application," dated Jun. 4, 2019, with English translation thereof, p. 1-p. 8.

* cited by examiner

METHOD OF MANUFACTURING ROTOR OF ROTARY ELECTRIC MACHINE

CROSS-REFERENCE TO RELATED APPLICATION

This application claims the priority benefit of Japan application serial no. 2016-097175, filed on May 13, 2016. The entirety of the above-mentioned patent application is hereby incorporated by reference herein and made a part of this specification.

BACKGROUND OF THE DISCLOSURE

Field of the Disclosure

The disclosure relates to a rotor of a rotary electric machine, a rotary electric machine, and a method of manufacturing a rotor of a rotary electric machine.

Description of Related Art

In the related art, a rotary electric machine including a stator and a rotor is known. The rotor includes a rotary shaft that is rotatably supported, a rotor core in which a plurality of magnetic plate members are stacked, a permanent magnet that is accommodated in a magnet slot formed in an axial direction from an end face of the rotor core, and an end plate that is disposed at an end in the axial direction of the rotor core and holds a magnet (for example, see Japanese Unexamined Patent Application Publication No. 2014-57443).

The end plate is disposed to cover the end face in the axial direction of the rotor core and serves to prevent the permanent magnet from falling out through an opening of the magnet slot. The end plate is formed of a non magnetic material such as aluminum.

SUMMARY OF THE DISCLOSURE

Problem to be Solved

However, because aluminum is a conductor, when an end plate is formed of aluminum, there is concern of an Eddy current being generated in the end plate and efficiency of the rotary electric machine decreasing. Since aluminum has a large specific gravity, there is concern of the weight of the rotor increasing.

Therefore, the disclosure provides a rotor of a rotary electric machine that has excellent efficiency and light weight, a rotary electric machine having the rotor, and a method of manufacturing the rotor of the rotary electric machine.

Solution to the Problem

A rotor (for example, a rotor 21 or 121 in an embodiment) of a rotary electric machine (for example, a motor 23 in the embodiment) according to the disclosure includes: a rotary shaft (for example, a rotary shaft 24 in the embodiment); a rotor core (for example, a rotor core 61 in the embodiment) that is fixed coaxially to the rotary shaft and formed of electromagnetic steel; and an end plate (for example, a first end plate 71 and a second end plate 72 in the embodiment) that is disposed to face an end face (for example, a first end face 61*a* and a second end face 61*b* in the embodiment) of the rotor core, and the end plate is formed of a bond magnet.

According to the disclosure, since the bond magnet is an insulating material, it is possible to prevent an Eddy current from being generated with a variation in magnetic flux in the end plate. Accordingly, it is possible to improve efficiency of the rotary electric machine.

Since the bond magnet has a lower specific gravity than aluminum, it is possible to decrease the weight of the rotor.

Accordingly, it is possible to provide a rotor of a rotary electric machine having excellent efficiency and light weight.

In the rotor of the rotary electric machine, it is preferable that a slot (for example, a slot 64 in the embodiment) extending in an axial direction be formed in the rotor core, a rotor magnet (for example, a rotor magnet 69 in the embodiment) formed of a bond magnet be disposed in the slot, and the rotor magnet be integrated with the end plate.

According to the disclosure, since the end plate and the rotor magnet are formed of the same material, it is possible to decrease a manufacturing cost and to decrease the number of components, thereby facilitating manufacturing.

Since the rotor magnet is integrated with the end plate, the rotor magnet can be connected to the end plate at an end in the axial direction in the slot. Accordingly, it is possible to prevent a state in which the rotor magnet is not disposed at an end in the axial direction in the slot. Accordingly, it is possible to prevent a decrease in efficiency of the rotary electric machine.

In the rotor of the rotary electric machine, it is preferable that a slot flow channel (for example, a slot flow channel 66 in the embodiment) in which a refrigerant flows be disposed between the rotor magnet and the rotor core.

According to the disclosure, since the rotor magnet can be directly cooled by causing a refrigerant to flow in the slot flow channel, it is possible to prevent demagnetization of the rotor magnet. Accordingly, it is possible to prevent a decrease in efficiency of the rotary electric machine.

In the rotor of the rotary electric machine, it is preferable that an end flow channel (for example, an end flow channel 74 in the embodiment) in which a refrigerant flows be disposed between the end plate and the rotor core.

According to the disclosure, the end plate can be cooled by causing a refrigerant to flow in the end flow channel. Accordingly, even when the end plate is magnetized along with the rotor magnet disposed in the rotor core, it is possible to prevent demagnetization of the end plate. Accordingly, it is possible to prevent a decrease in efficiency of the rotary electric machine.

In the rotor of the rotary electric machine, it is preferable that a recessed portion (for example, a recessed portion 76 in the embodiment) be formed on a principal surface (for example, an outer principal surface 72*a* in the embodiment) of the end plate facing an opposite side of the rotor core.

According to the disclosure, by forming a recessed portion in the end plate through drilling or the like depending on a degree of eccentricity of the rotor in the course of manufacture, it is possible to easily adjust a position of the center of gravity of the rotor and to resolve eccentricity of the rotor. Accordingly, it is possible to form a rotary electric machine with suppressed vibration or noise.

A rotary electric machine according to the disclosure includes: the rotor of the rotary electric machine; and a stator (for example, a stator 22 in the embodiment) that is disposed to face the rotor in a radial direction and includes a stator core (for example, a stator core 45 in the embodiment) formed of a plurality of electromagnetic steel plates which are stacked, and a part of the stator core is disposed at the same position in the axial direction as the end plate.

According to the disclosure, magnetic flux generated from the magnetized end plate can be absorbed in a part of the stator core disposed at the same position in the axial direction as the end plate. Accordingly, it is possible to decrease magnetic flux leakage between the rotor and the stator and to improve efficiency of the rotary electric machine.

In the rotary electric machine, it is preferable that an electromagnetic steel plate, that is one of the plurality of electromagnetic steel plates and disposed to face the end plate in the radial direction, be disposed at an end in the axial direction of the stator core and include a protruding portion (for example, a protruding portion 44a in the embodiment) protruding in the axial direction from an end on the end plate side in the radial direction.

According to the disclosure, it is possible to secure the area of a part of the stator core facing the end plate in the radial direction using the protruding portion and to decrease the size in the axial direction of the stator core in a part other than the protruding portion. Accordingly, a crossing portion of a coil wound on the stator core can be disposed close to the center of the stator core in the axial direction. Accordingly, it is possible to decrease the size in the axial direction of the stator and to provide a small type of rotary electric machine.

A method of manufacturing a rotor of a rotary electric machine according to the disclosure is a method of manufacturing the rotor of the rotary electric machine (for example, a rotor 121 in the embodiment) and includes: a slot pin arranging step of arranging a slot pin (for example, a slot pin 210 in the embodiment) on an inner surface of a slot (for example, a slot 64 in the embodiment) formed in a rotor core; an end pin arranging step of arranging an end pin (for example, an end pin 206b in the embodiment) extending in a radial direction on an end face (for example, a first end face 61a in the embodiment) of the rotor core; an injection step of injecting a bond magnet into a mold (for example, a mold 201 in the embodiment) in which the rotor core is set; and a pin drawing step of drawing out the slot pin and the end pin to form a flow channel in which a refrigerant flows.

According to the disclosure, a flow channel for allowing a refrigerant to flow can be easily formed in the slot and on the end face of the rotor core. Accordingly, since the rotor magnet disposed in the slot or the end plate can be cooled, it is possible to prevent demagnetization of the rotor magnet or the end plate. Accordingly, it is possible to manufacture a rotor that can prevent a decrease in efficiency of the rotary electric machine.

Effects of the Disclosure

According to the disclosure, it is possible to provide a rotor of a rotary electric machine that has excellent efficiency and light weight.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF THE DISCLOSURE

Hereinafter, an embodiment of the disclosure will be described with reference to the accompanying drawings. A motor which is employed as a rotary electric machine by a drive motor unit for an automobile will be described in the embodiment. In the following description, an axial direction of a rotary shaft of the motor is simply referred to as an "axial direction," a circumferential direction of the rotary shaft is simply referred to as a "circumferential direction," and a direction perpendicular to the axial direction and extending radially from the rotary shaft is simply referred to as a "radial direction."

First, a drive motor unit 10 (hereinafter referred to as a "motor unit") for an automobile according to the embodiment will be described below.

Figure 1:
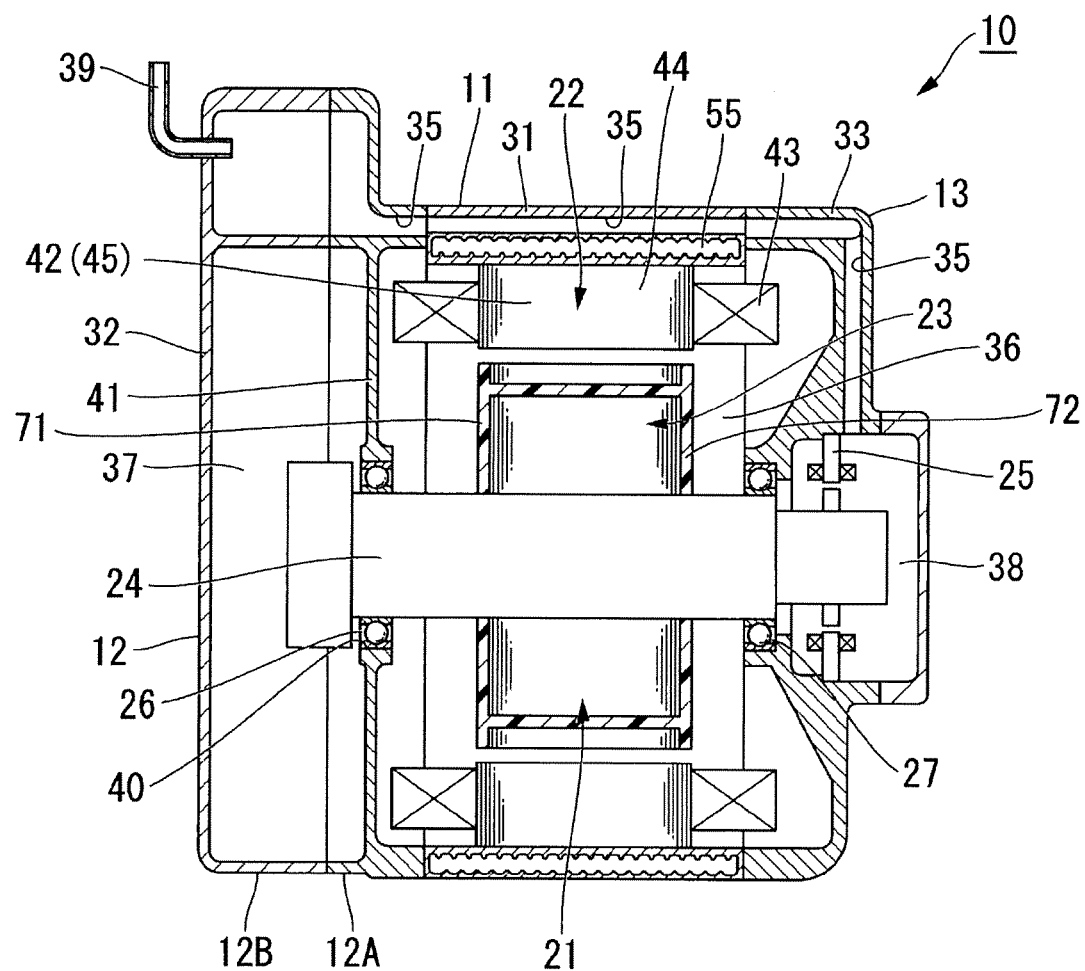
FIG. 1 is a cross-sectional view schematically illustrating a configuration of a drive motor unit for an automobile.

FIG. 1 is a cross-sectional view schematically illustrating a configuration of the motor unit.

As illustrated in FIG. 1, the motor unit 10 includes a motor housing 11 in which a motor 23 including a rotor 21 and a stator 22 is accommodated, a transmission housing 12 which is coupled to one side in the axial direction of the motor housing 11 and in which a power transmission portion (not illustrated) for transmitting power from a rotary shaft 24 of the motor 23 is accommodated, and a sensor housing 13 which is coupled to the other side in the axial direction of the motor housing 11 and in which a rotation sensor 25 of the motor 23 is accommodated. The transmission housing 12 includes a common housing 12A which is coupled to the motor housing 11 and a gear housing 12B which is coupled to the common housing 12A. A motor chamber 36 is formed in the motor housing 11, a transmission chamber 37 is formed in the transmission housing 12, and a sensor chamber 38 is formed in the sensor housing 13.

The motor housing 11 is formed in a cylindrical shape to cover the whole motor 23. The common housing 12A is constituted as a boundary between the motor housing 11 and the transmission housing 12, and a partition wall 41 that defines the motor chamber 36 and the transmission chamber 37 is formed between the motor housing 11 and the transmission housing 12. A through-hole 40 that penetrates the partition wall 41 in the thickness direction thereof is formed at the center in the radial direction of the partition wall 41. A bearing 26 that rotatably supports an end of the rotary shaft 24 of the motor 23 is inserted into the through-hole 40. On the other hand, a bearing 27 that rotatably supports the other end of the rotary shaft 24 of the motor 23 is inserted into the sensor housing 13 side of the boundary between the motor housing 11 and the sensor housing 13.

In the motor unit 10 (the motor housing 11, the transmission housing 12, and the sensor housing 13), a refrigerant (for example, a lubricant) for cooling the bearings 26 and 27, the motor 23, and the like is introduced and the motor 23 is disposed in a state in which a part of the stator 22 is immersed in the refrigerant. An oil pump (not illustrated) is disposed between the motor housing 11 and the transmission housing 12, and the refrigerant pumped by the oil pump can circulate in the motor unit 10 via an oil flow channel which is not illustrated. The refrigerant circulating in the motor unit 10 is supplied to the bearings 26 and 27 and the like to cool the bearings 26 and 27 and the like.

Breather passages 35 communicating with each other are formed in a wall portion 31 of the motor housing 11, a wall portion 32 of the transmission housing 12, and a wall portion 33 of the sensor housing 13 to discharge high-pressure and high-temperature air in the motor unit 10 from a breather pipe 39.

In the wall portion 31 of the motor housing 11, a water jacket 55 for cooling the motor 23 is disposed on the inner circumference side of the breather passages 35 to cover the entire circumference of the stator 22 in the motor 23. The stator 22 is shrink-fitted to the motor housing 11 and is disposed in close contact with the inner circumferential surface of the motor housing 11.

The motor 23 is an inner rotor type interior permanent magnet (IPM) motor and includes the rotor 21 that is rotatably supported by the motor housing 11 and the stator 22 that is disposed to face the rotor 21 in the radial direction.

Figure 2:
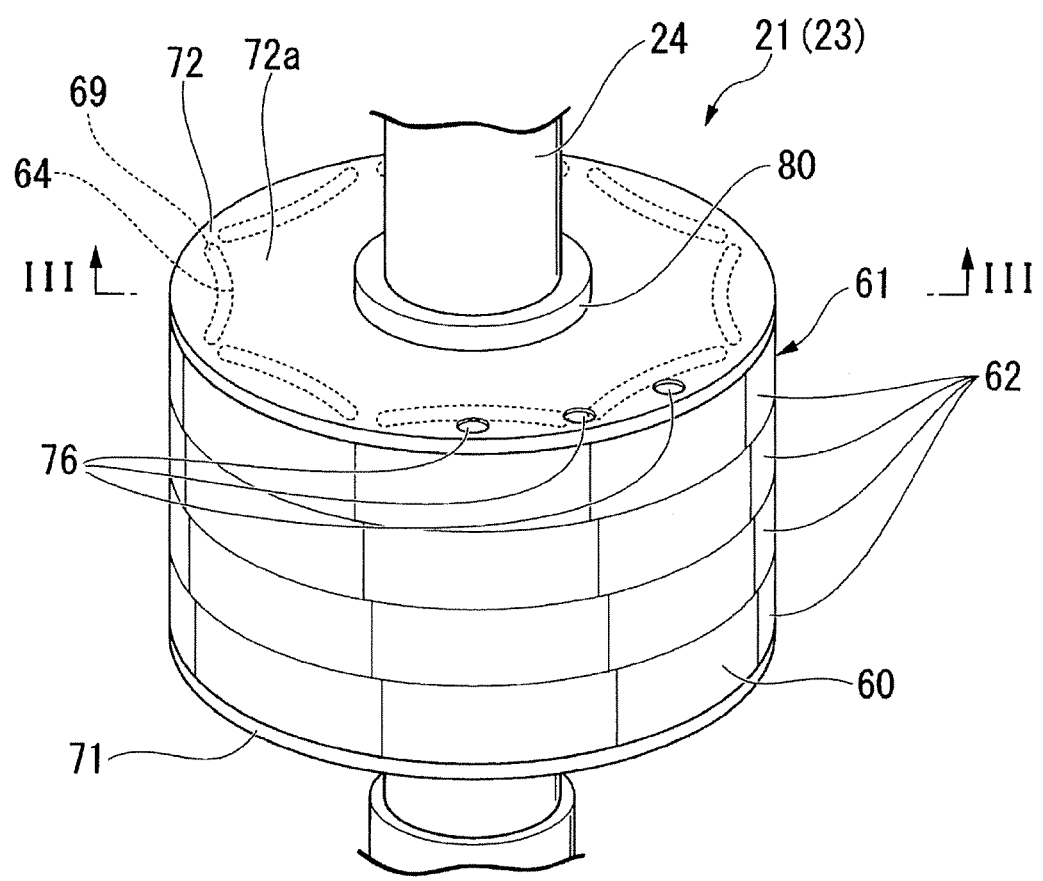
FIG. 2 is a perspective view of a rotor according to an embodiment.
Figure 3:
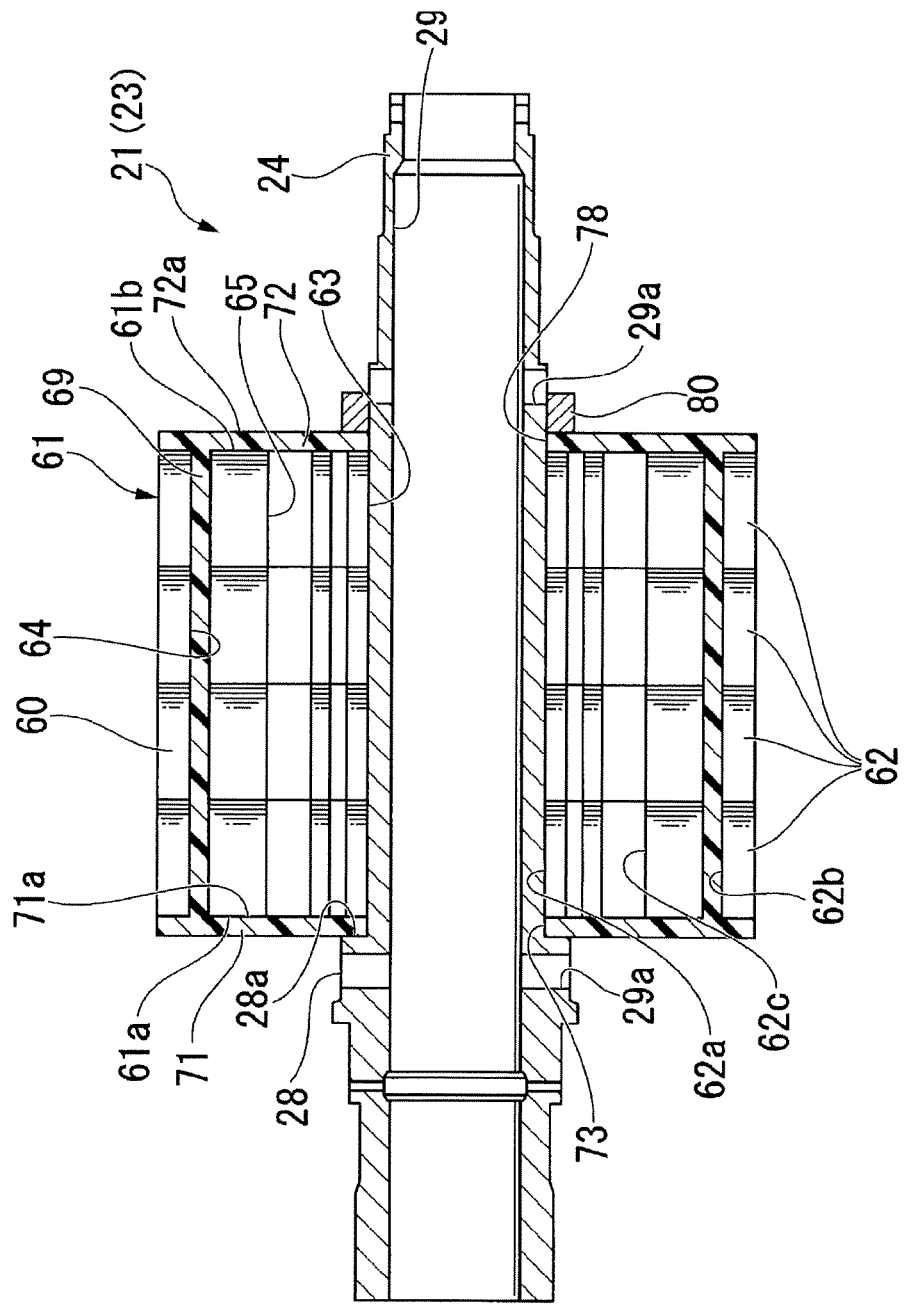
FIG. 3 is a longitudinal sectional view taken along line in FIG. 2.

FIG. 2 is a perspective view of the rotor according to the embodiment. FIG. 3 is a longitudinal sectional view taken along line in FIG. 2.

As illustrated in FIGS. 2 and 3, the rotor 21 includes a rotary shaft 24 that is rotatably supported, a rotor core 61 that is press-fitted and fixed coaxially to the outer circumference of the rotary shaft 24, and a pair of end plates (a first end plate 71 and a second end plate 72) that are disposed to face both end faces 61a and 61b in the axial direction of the rotor core 61.

As illustrated in FIG. 3, the rotary shaft 24 is a cylindrical hollow member which is formed of stainless steel, iron, or the like, and is formed by forging, casting, machining, or the like. The inside of the rotary shaft 24 is hollow and serves as a refrigerant flow channel 29 through which the refrigerant flows. A plurality of first ejection holes 29a which are opened to the outer circumferential surface to cause the above-mentioned refrigerant flow channel 29 to communicate with the outside of the rotor 21 are formed in the rotary shaft 24. The refrigerant is supplied from the above-mentioned oil pump (not illustrated). The refrigerant supplied from the oil pump is ejected from the first ejection holes 29a via the refrigerant flow channel 29 by a centrifugal force generated with the rotation of the rotor 21.

A diameter-increased portion 28 is formed on the outer circumferential surface of the rotary shaft 24. The diameter-increased portion 28 is formed on one side in the axial direction of the rotor core 61. A stepped face 28a facing the other side in the axial direction of the diameter-increased portion 28 is formed to be perpendicular to the axial direction.

The rotor core 61 is a member which is disposed inside the stator 22 (see FIG. 1) with a predetermined gap therebetween and which has a ring shape when viewed in the axial direction. The rotor core 61 is formed of electromagnetic steel. A through-hole 63 penetrating the rotor core 61 in the axial direction is formed at the center in the radial direction of the rotor core 61. The rotary shaft 24 is press-fitted into the through-hole 63. As illustrated in FIG. 2, a plurality of (eight in the embodiment) slots 64 penetrating the rotor core in the axial direction are formed in the circumferential portion of the rotor core 61. The plurality of slots 64 are arranged in the circumferential direction in the circumferential portion of the rotor core 61. Each slot 64 is formed in an arc shape or a rectangular shape when viewed in the axial direction. As illustrated in FIG. 3, a plurality of (eight in the embodiment) lightening holes 65 are formed between the through-hole 63 and the slots 64 in the radial direction of the rotor core 61 to achieve a decrease in weight.

The rotor core 61 is divided in the axial direction into a plurality of (four in the embodiment) divided cores 62 having the same shape. In each divided core 62, magnetic plate members 60 formed of electromagnetic steel are stacked in the axial direction. In each divided core 62, a divided through-hole 62a forming a part of the through-hole 63 of the rotor core 61, divided slots 62b forming a part of the slots 64, and divided lightening holes 62c forming a part of the lightening holes 65 are formed. The divided cores 62 arranged in the axial direction are arranged in a state in which phases thereof are sequentially misaligned to one side in the circumferential direction (see FIG. 2).

A rotor magnet 69 is accommodated in each slot 64. The rotor magnet 69 is formed of a bond magnet. The bond magnet includes, for example, a mixed material of a magnet powder of a neodymium magnet or the like and a thermoplastic resin. The rotor magnet 69 is magnetized in the radial direction to form a plurality of (eight in the embodiment) magnetic pole portions in the outer circumferential portion of the rotor core 61. The plurality of magnetic pole portions are formed such that the magnetization direction is alternately inverted in the circumferential direction.

The first end plate 71 is disposed to face a first end face 61a facing one side in the axial direction of the rotor core 61 and is interposed between the stepped face 28a of the diameter-increased portion 28 of the rotary shaft 24 and the rotor core 61. The first end plate 71 is formed of a bond magnet. The bond magnet includes, for example, a mixed material of a magnet powder of a neodymium magnet or the like and a thermoplastic resin. The first end plate 71 is formed in a disc shape having an outer diameter equal to the outer diameter of the rotor core 61. A first insertion hole 73 which penetrates the first end plate 71 in the thickness direction (the axial direction) thereof and through which the rotary shaft 24 is inserted is formed in the center in the radial direction of the first end plate 71. The first insertion hole 73 has an inner diameter equal to the outer diameter of the rotary shaft 24 and is in close contact with the outer circumferential surface of the rotary shaft 24.

The second end plate 72 is disposed to face a second end face 61b facing the other side in the axial direction of the rotor core 61 and is interposed between a collar 80 press-fitted to the outer circumference of the rotary shaft 24 and the rotor core 61. The second end plate 72 is formed of a bond magnet. The bond magnet includes, for example, a mixed material of a magnet powder of a neodymium magnet or the like and a thermoplastic resin. The second end plate 72 is formed in a disc shape having an outer diameter equal to the outer diameter of the rotor core 61. A second insertion hole 78 which penetrates the second end plate 72 in the thickness direction (the axial direction) thereof and through which the rotary shaft 24 is inserted is formed in the central portion in the radial direction of the second end plate 72. The second insertion hole 78 has an inner diameter equal to the outer diameter of the rotary shaft 24 and is in close contact with the outer circumferential surface of the rotary shaft 24.

The end plates 71 and 72 are formed integrally with the rotor magnets 69. The end plates 71 and 72 and the rotor magnets 69 are formed by injection molding. Specifically, the end plates 71 and 72 and the rotor magnets 69 are integrally formed by injecting a heated and softened bond magnet into a mold in which the rotor core 61 is set. The end plates 71 and 72 are magnetized along the magnetization directions of the rotor magnets 69. That is, the magnetization directions of the portions of the end plates 71 and 72 are consistent to the magnetization directions of the rotor magnets 69 which are arranged at the same positions in the circumferential direction.

As illustrated in FIG. 2, a circular recessed portion 76 is formed in the outer circumferential portion on the outer principal surface 72a of the second end plate 72 facing the side opposite to the rotor core 61. The recessed portion 76 is formed by drilling using a drill or the like depending on a degree of eccentricity of the rotor 21. The size, the number, the position, and the like of the recessed portions 76 are appropriately set depending on the degree of eccentricity of the rotor 21.

Figure 4:
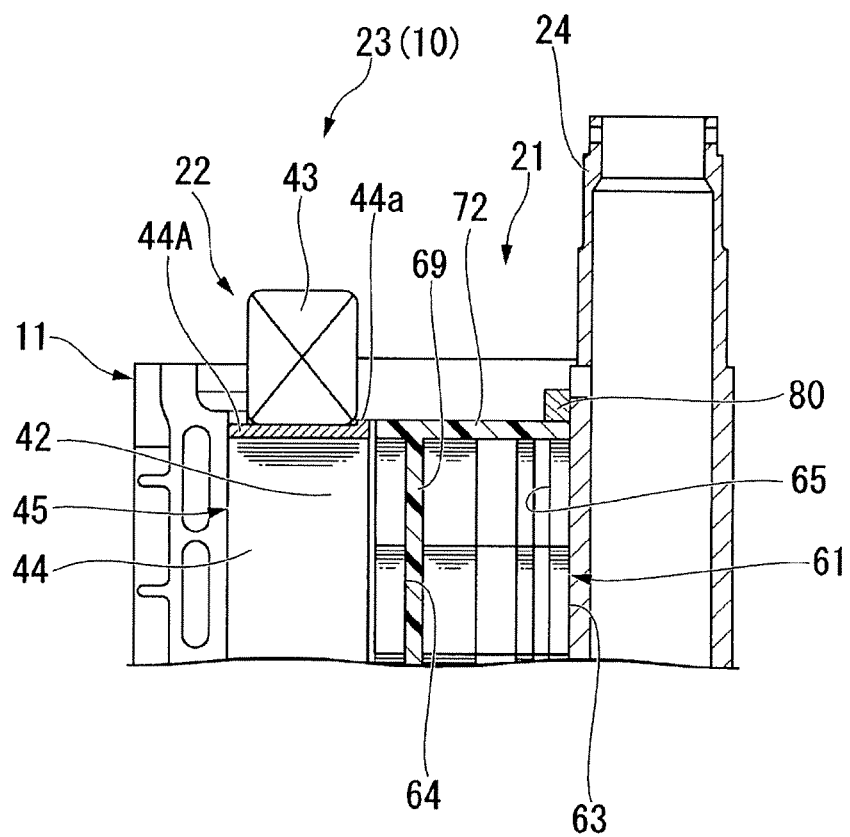
FIG. 4 is an enlarged longitudinal sectional view of a drive motor unit for an automobile according to the embodiment.

FIG. 4 is an enlarged longitudinal sectional view of the motor unit according to the embodiment.

As illustrated in FIG. 4, the stator 22 includes a stator core 45 which is formed of a plurality of electromagnetic steel plates 44 stacked in the axial direction. The stator core 45 includes a tooth 42 extending to the inside in the radial direction. A coil 43 is wound on the tooth 42 with an insulator (not illustrated) interposed therebetween. As illustrated in FIG. 1, the stator core 45 is disposed from a position in the axial direction facing the first end plate 71 in the radial direction to a position in the axial direction facing the second end plate 72 in the radial direction. That is, ends in the axial direction of the stator core 45 are disposed at the same positions in the axial direction of the end plates 71 and 72.

As illustrated in FIG. 4, the electromagnetic steel plate 44A disposed at the other end in the axial direction among the plurality of electromagnetic steel plates 44 is disposed to face the second end plate 72 in the radial direction. The electromagnetic steel plate 44A is formed thinner than the second end plate 72. The electromagnetic steel plate 44A includes a protruding portion 44a protruding to the other side in the axial direction to extend in the axial direction at the inner end in the radial direction. Accordingly, an inner end face in the radial direction of the electromagnetic steel plate 44A faces the entire outer end face in the radial direction of the second end plate 72 in the radial direction. The same is true of the electromagnetic steel plate (not illustrated) disposed at one end in the axial direction among the plurality of electromagnetic steel plates 44. That is, the electromagnetic steel plate disposed at one end in the axial direction includes a protruding portion protruding to one side in the axial direction to extend in the axial direction at the inner end in the radial direction.

As described above in detail, in the embodiment, the first end plate 71 and the second end plate 72 are formed of a bond magnet.

According to this configuration, since the bond magnet is an insulating material, it is possible to prevent an Eddy current from being generated with a variation in magnetic flux in the end plates 71 and 72. Accordingly, it is possible to improve efficiency of the motor 23. Since the bond magnet has a lower specific gravity than aluminum, it is possible to decrease the weight of the rotor 21. As a result, it is possible to provide a rotor 21 of the motor 23 which has excellent efficiency and light weight.

The rotor magnets 69 are integrated with the end plates 71 and 72.

According to this configuration, since the end plates 71 and 72 and the rotor magnets 69 are formed of the same material, it is possible to decrease a manufacturing cost and to decrease the number of components, thereby facilitating manufacturing.

Since the rotor magnets 69 are integrated with the end plates 71 and 72, the rotor magnets 69 can be connected to the end plates 71 and 72 at the ends in the axial direction in the slots 64. Accordingly, it is possible to prevent a state in which the rotor magnets 69 are not disposed at the ends in the axial direction in the slots 64. Accordingly, it is possible to prevent a decrease in efficiency of the motor 23.

In addition, the recessed portion 76 is formed on the outer principal surface 72a of the second end plate 72. According to this configuration, by forming the recessed portion 76 in the second end plate 72 through drilling or the like depending on a degree of eccentricity of the rotor 21 in the course of manufacture, it is possible to easily adjust a position of the center of gravity of the rotor 21 and to resolve eccentricity of the rotor 21. Accordingly, it is possible to form the motor 23 with suppressed vibration or noise.

A part of the stator core 45 is disposed at the same position in the axial direction as the end plates 71 and 72.

According to this configuration, magnetic flux generated from the magnetized end plates 71 and 72 can be absorbed in a part of the stator core 45 disposed at the same position in the axial direction as the end plates 71 and 72. Accordingly, it is possible to decrease magnetic flux leakage between the rotor 21 and the stator 22 and to improve efficiency of the motor 23.

The electromagnetic steel plate 44A disposed to face the second end plate 72 in the radial direction is disposed at an end in the axial direction of the stator core 45 and includes the protruding portion 44a protruding in the axial direction at the inner end in the radial direction.

According to this configuration, it is possible to secure the area of a part of the stator core 45 facing the second end plate 72 in the radial direction using the protruding portion 44a and to decrease the size in the axial direction of the stator core 45 in a part other than the protruding portion 44a. The same is true of the electromagnetic steel plate disposed to face the first end plate 71 in the radial direction (not illustrated). Accordingly, a crossing portion of the coil 43 wound on the stator core 45 can be disposed close to the center of the stator core 45 in the axial direction. Accordingly, it is possible to decrease the size in the axial direction of the stator 22 and to provide a small motor 23.

A rotor 121 according to a modified example of the embodiment will be described below.

Figure 5:
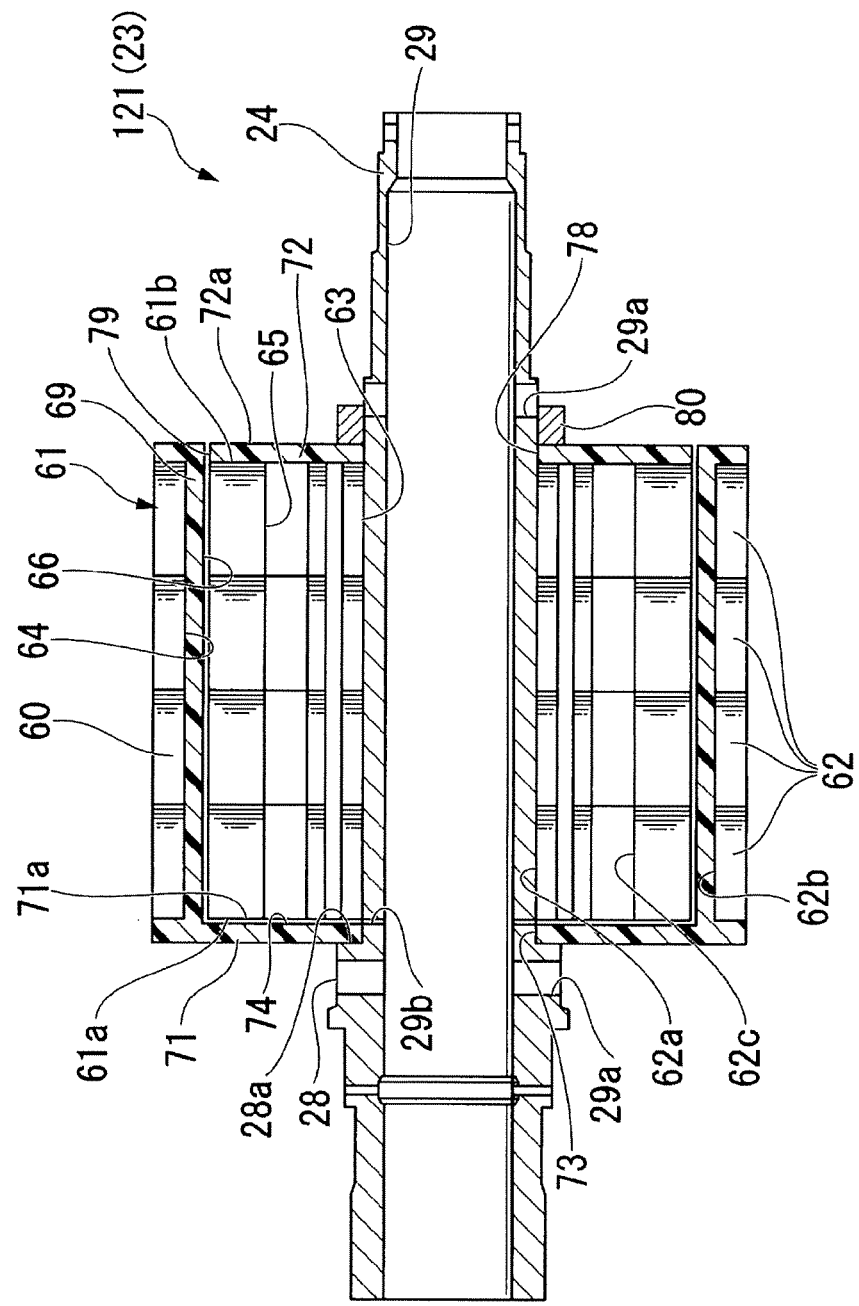
FIG. 5 is a diagram illustrating a rotor according to a modified example of the embodiment and is a longitudinal sectional view of a portion corresponding to line in FIG. 2.
Figure 6:
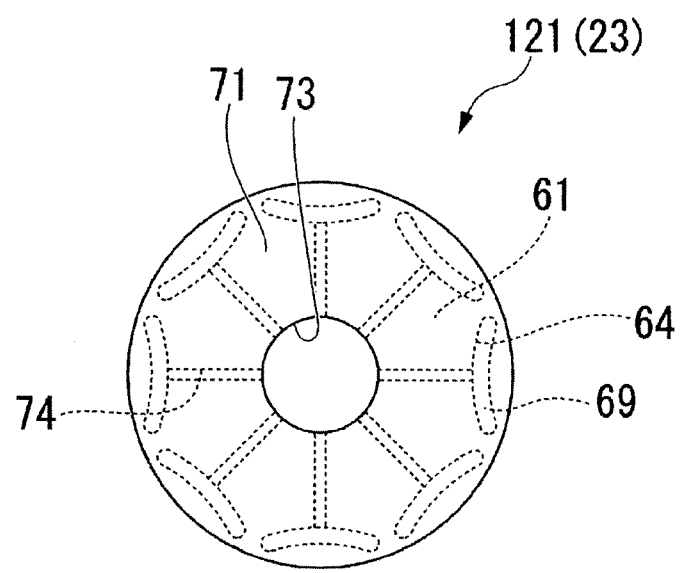
FIG. 6 is a diagram illustrating the rotor according to the modified example of the embodiment when a rotor core and a first end plate are viewed in the axial direction.

FIG. 5 is a diagram illustrating a rotor according to a modified example of the embodiment and is a longitudinal sectional view of a portion corresponding to line in FIG. 2. FIG. 6 is a diagram illustrating the rotor according to the modified example of the embodiment when a rotor core and a first end plate are viewed in the axial direction.

The modified example of the embodiment illustrated in FIGS. 5 and 6 is different from the embodiment illustrated in FIGS. 2 to 4, in that a slot flow channel 66 and an end flow channel 74 are formed in the rotor 121. The same elements as in the embodiment illustrated in FIGS. 2 to 4 will be referenced by the same reference signs and detailed description thereof will not be repeated.

As illustrated in FIG. 5, a plurality of (eight in the embodiment) slot flow channels 66 in which a refrigerant can flow are formed between the rotor magnets 69 and the rotor core 61 (the inner surfaces of the slots 64). The slot flow channels 66 extend over the entire length of the slots 64 in the axial direction on the inner side in the radial direction in the slots 64.

A plurality of (eight in the embodiment) through-holes 79 are formed in the second end plate 72. The through-holes 79 are formed at the same position as the slot flow channel 66 when viewed in the axial direction. The through-holes 79 are configured to enable a refrigerant flowing in the slot flow channel 66 to flow.

As illustrated in FIGS. 5 and 6, a plurality of (eight in the embodiment) end flow channels 74 in which a refrigerant can flow are formed on the inner principal surface 71a of the first end plate 71 facing the rotor core 61. The plurality of end flow channels 74 are formed in a groove shape extending linearly in the radial direction and are arranged in the circumferential direction. Outer ends in the radial direction of the end flow channels 74 communicate with the ends on one side in the axial direction of the slot flow channels 66. The inner ends in the radial direction of the end flow channels 74 are opened to the inner circumferential surface of the first insertion hole 73 of the first end plate 71.

As illustrated in FIG. 5, a plurality of (eight in the embodiment) second ejection holes 29b which are opened to the outer circumferential surface to cause the refrigerant flow channel 29 to communicate with the end flow channels 74 are formed in the rotary shaft 24. The refrigerant supplied to the refrigerant flow channel 29 of the rotary shaft 24 from the oil pump is ejected from the first ejection holes 29a and the second ejection holes 29b by a centrifugal force generated with the rotation of the rotor 121. Particularly, the refrigerant ejected from the second ejection holes 29b is ejected to the outside of the rotor 121 via the end flow channels 74, the slot flow channels 66, and the through-holes 79.

A method of manufacturing the rotor 121 according to the modified example will be described below.

Figure 7:
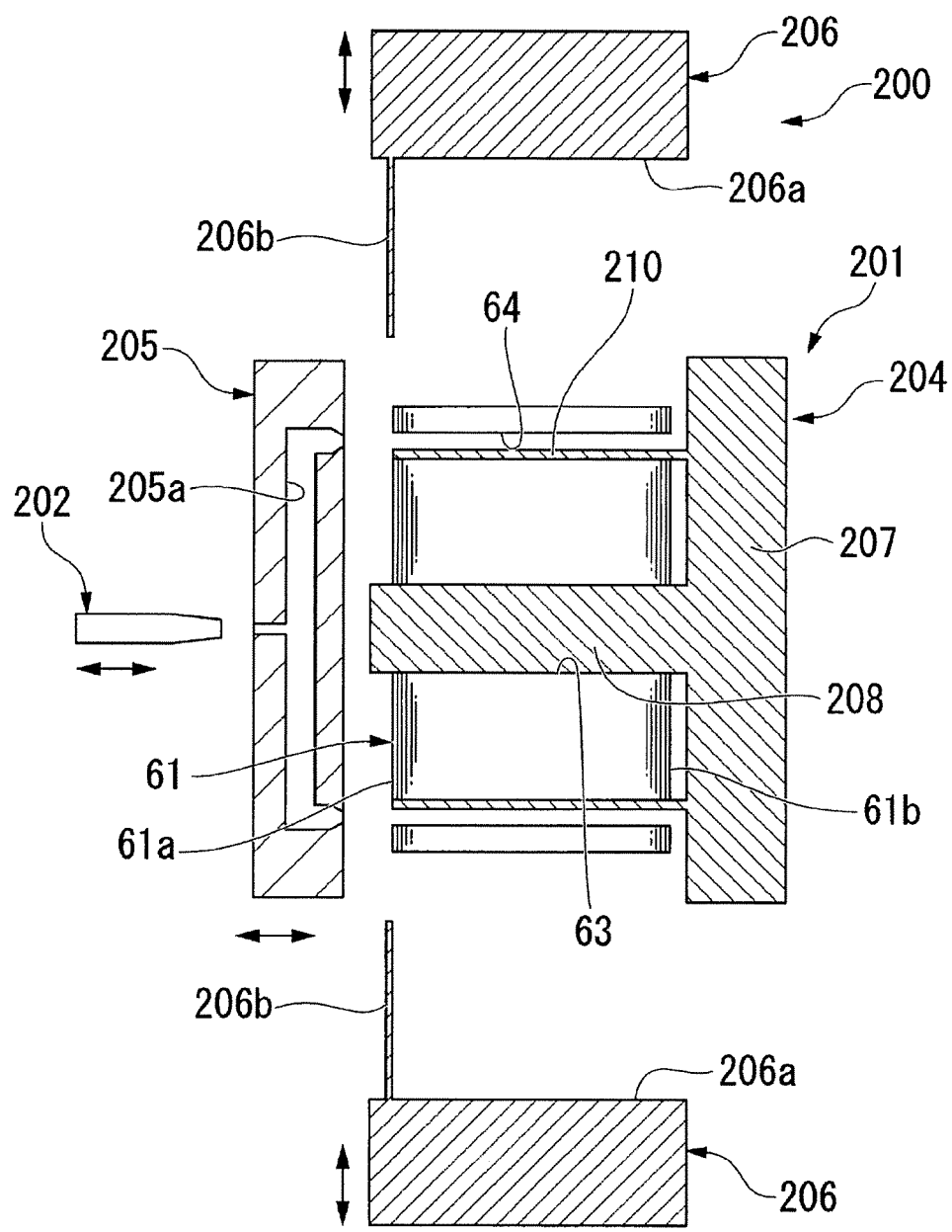
FIG. 7 is a diagram illustrating a process of manufacturing the rotor according to the modified example of the embodiment.
Figure 8:
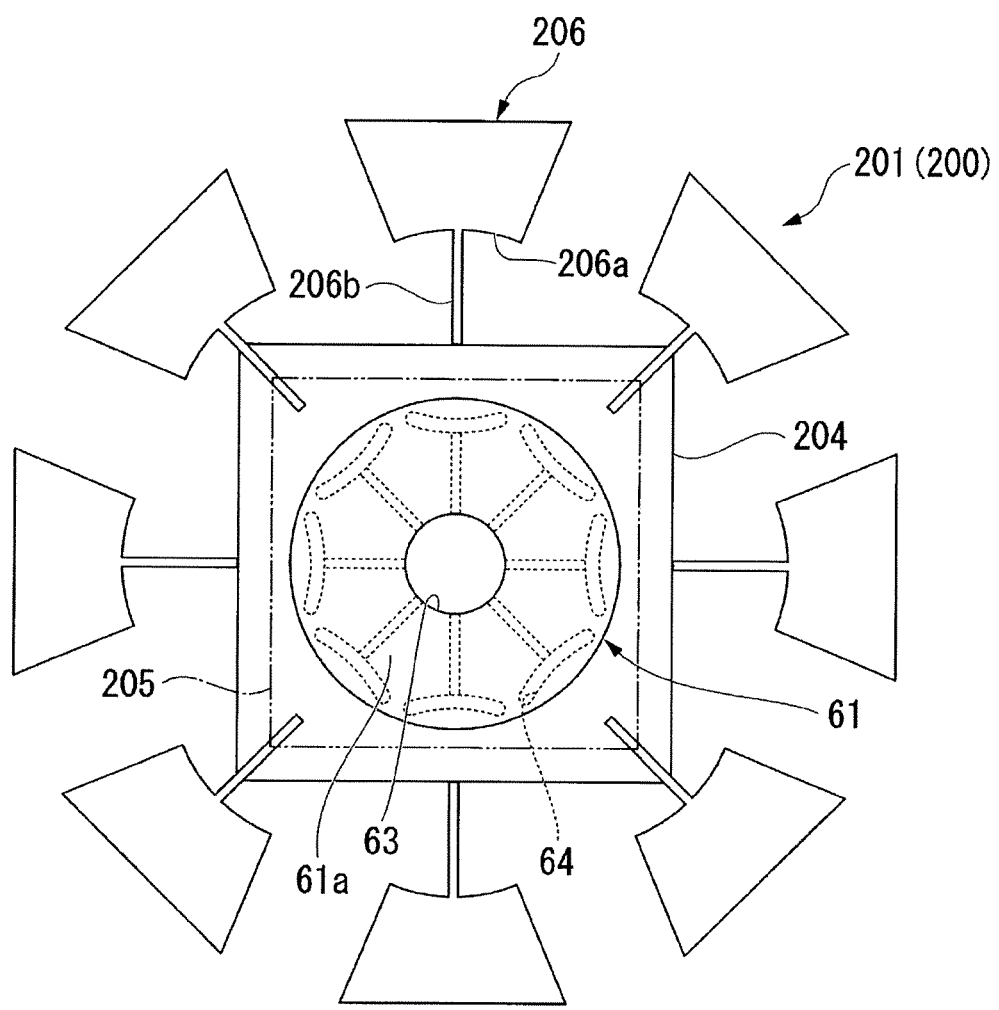
FIG. 8 is a diagram illustrating the process of manufacturing the rotor according to the modified example of the embodiment.
Figure 9:
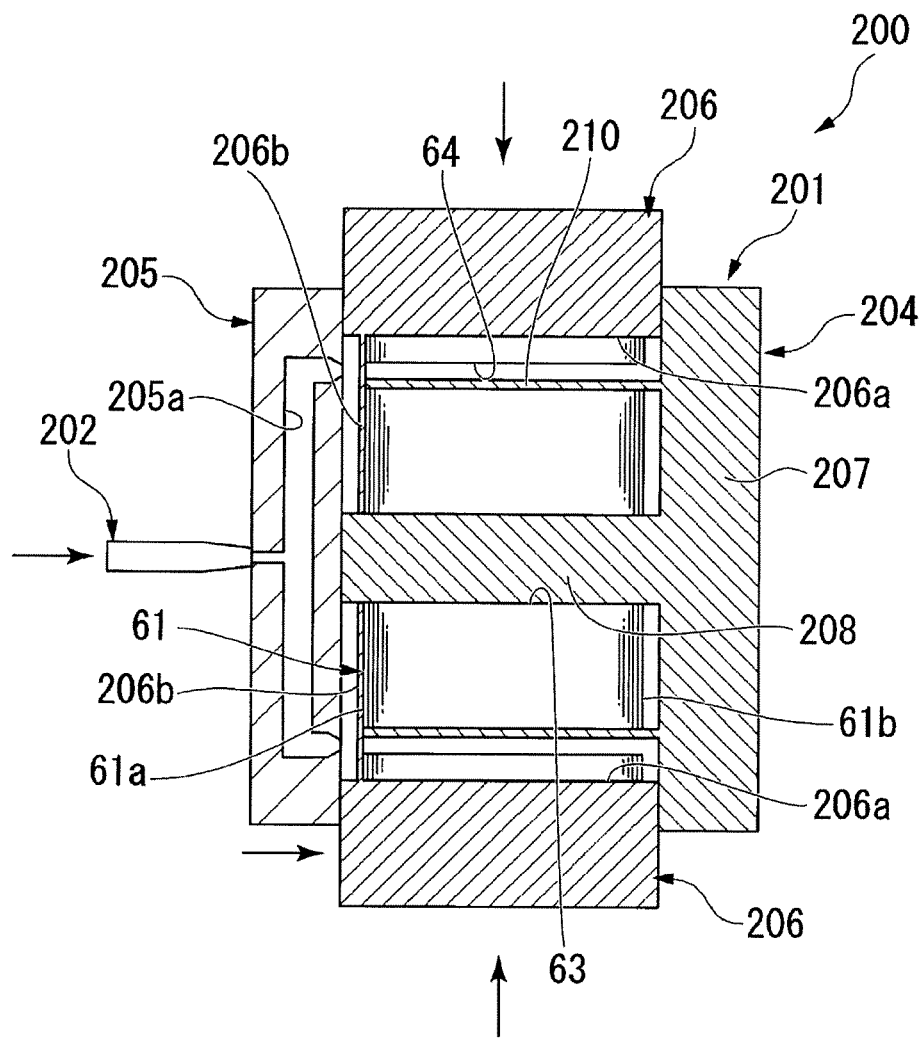
FIG. 9 is a diagram illustrating the process of manufacturing the rotor according to the modified example of the embodiment.
Figure 10:
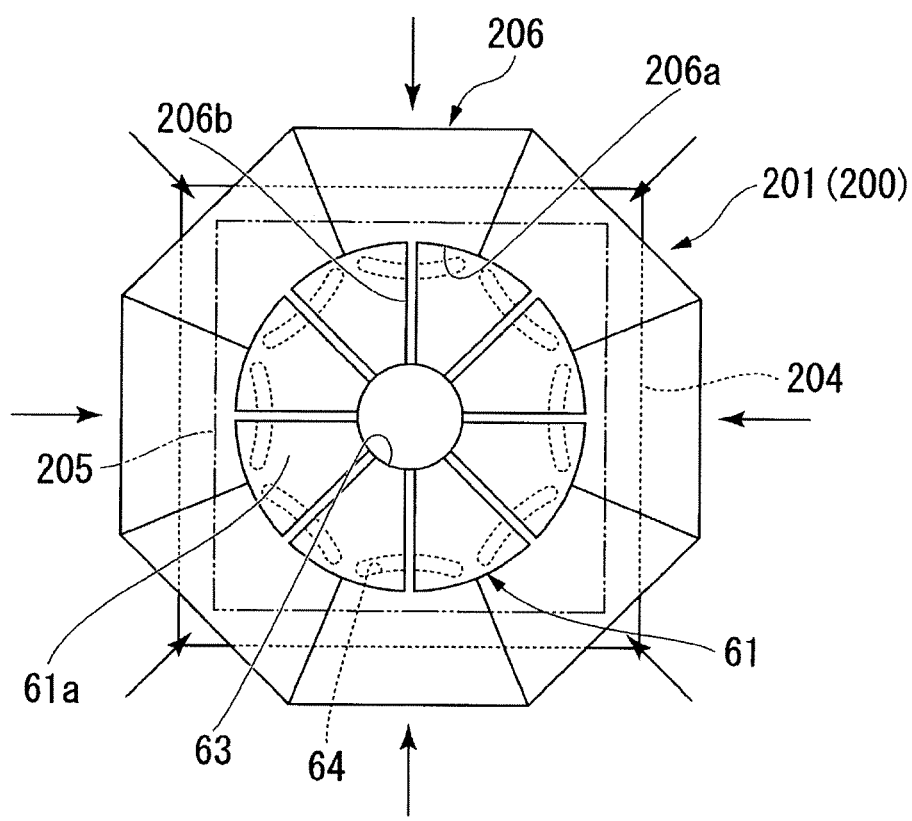
FIG. 10 is a diagram illustrating the process of manufacturing the rotor according to the modified example of the embodiment.

FIGS. 7 to 13 are diagrams illustrating a process of manufacturing the rotor according to the modified example of the embodiment. FIGS. 7 and 9 and FIGS. 11 to 13 are schematic side cross-sectional views of an injection machine 200 to be described later on a cross-section passing through the center axis of the rotor core 61. FIGS. 8 and 10 are schematic views when a mold 201 in which the rotor core 61 is set is viewed in the axial direction of the rotor core 61. In FIGS. 8 and 10, an infilling mold 205 to be described later is indicated by a two-dot chained line. FIG. 5 is referred to for the reference signs of the elements of the rotor 121 in the following description.

The method of manufacturing the rotor 121 according to the embodiment mainly includes a setting step, an injection step, a pin 11 drawing step, a sealing step, and a magnetization step. An injection machine 200 is used for the setting step, the injection step, and the pin drawing step.

First, the gist of the injection machine 200 will be described with reference to the drawings. As illustrated in FIGS. 7 and 8, the injection machine 200 includes a mold 201 and an injection nozzle 202.

The mold 201 includes a base mold 204, an infilling mold 205, and a plurality of (eight in the embodiment) slide core molds 206.

As illustrated in FIG. 7, the base mold 204 holds the rotor core 61. The base mold 204 includes a base portion 207 that faces the second end face 61b of the rotor core 61, a positioning portion 208 that rises upright from the base portion 207 and is tightly inserted into the through-hole 63 of the rotor core 61, and a plurality of slot pins 210 that rise upright from the base portion 207 and are inserted into the slots 56 of the rotor core 61. The height of the positioning portion 208 is equal to the size in the axial direction including the rotor core 61 and the end plates 71 and 72. The height of the slot pins 210 is equal to the size in the axial direction including the rotor core 61 and the second end plate 72. The slot pins 210 are formed to correspond to the shapes of the slot flow channels 66 and the through-holes 79. That is, the slot pins 210 are formed thinner than the cross-sectional shapes of the slots 64 and are disposed to come in contact with the inner portions in the radial direction in the inner surfaces of the slots 64.

The infilling mold 205 is disposed to face the first end face 61a of the rotor core 61. The infilling mold 205 is movable in the axial direction on the side of the base mold 204 opposite to the base portion 207. A flow channel 205a which is opened to both sides in the axial direction is formed in the infilling mold 205. A heated and softened bond magnet flows in the flow channel 205a.

As illustrated in FIGS. 7 and 8, the plurality of slide core molds 206 are arranged in the circumferential direction on the outer side in the radial direction of the rotor core 61. Each slide core mold 206 is disposed to slidably move in the radial direction. Each slide core mold 206 includes an arc-shaped portion 206a facing the outer circumferential surface of the rotor core 61. The radius of curvature of the arc-shaped portion 206a is equal to the radius of curvature of the outer circumferential surface of the rotor core 61. The size in the axial direction of the arc-shaped portion 206a is equal to the size in the axial direction including the rotor core 61 and the end plates 71 and 72. Accordingly, the arc-shaped portions 206a of the plurality of slide core molds 206 are in contact with the entire outer circumferential surface of the rotor core 61.

An end pin 206b rises upright to the inside in the radial direction from the arc-shaped portion 206a of each slide core mold 206. The end pin 206b extends in the moving direction of the slide core mold 206. The end pin 206b is formed to correspond to the shape of the above-mentioned end flow channel 74. That is, the length of the end pin 206b is equal to the size from the outer circumferential surface of the rotor core 61 to the through-hole 63 in the radial direction. The end pins 206b are disposed at the same positions in the circumferential direction as the slot pins 210 of the base mold 204.

As illustrated in FIG. 7, the injection nozzle 202 is configured to inject a thermoplastic resin (bond magnet in the embodiment). The injection nozzle 202 injects the thermoplastic resin into the flow channel 205a of the infilling mold 205 from an opening at one end in the axial direction of the flow channel 205a to fill the flow channel.

The setting step includes a slot pin arranging step and an end pin arranging step. In the setting step, first, the rotor core 61 is set in the base mold 204. Specifically, the positioning portion 208 of the base mold 204 is inserted into the through-hole 63 of the rotor core 61 and the plurality of slot pins 210 are inserted into the slots 64 and are disposed on the inner surfaces of the slots 64 (the slot pin arranging step). At this time, the second end face 61b of the rotor core 61 is separated from the base portion 207 by a distance corresponding to the thickness of the second end plate 72.

Subsequently, as illustrated in FIGS. 9 and 10, the infilling mold 205 is moved to the base mold 204 and the infilling mold 205 is brought into contact with the tip of the positioning portion 208 of the base mold 204. The slide core molds 206 are moved to the inside in the radial direction, the arc-shaped portions 206a are brought into contact with the outer circumferential surface of the rotor core 61, and the end pin 206b is arranged on the first end face 61a of the rotor core 61 (the end pin arranging step). Then, so-called mold fastening is performed by pressing the slide core molds 206 against the rotor core 61 with a predetermined pressing force.

Figure 11:
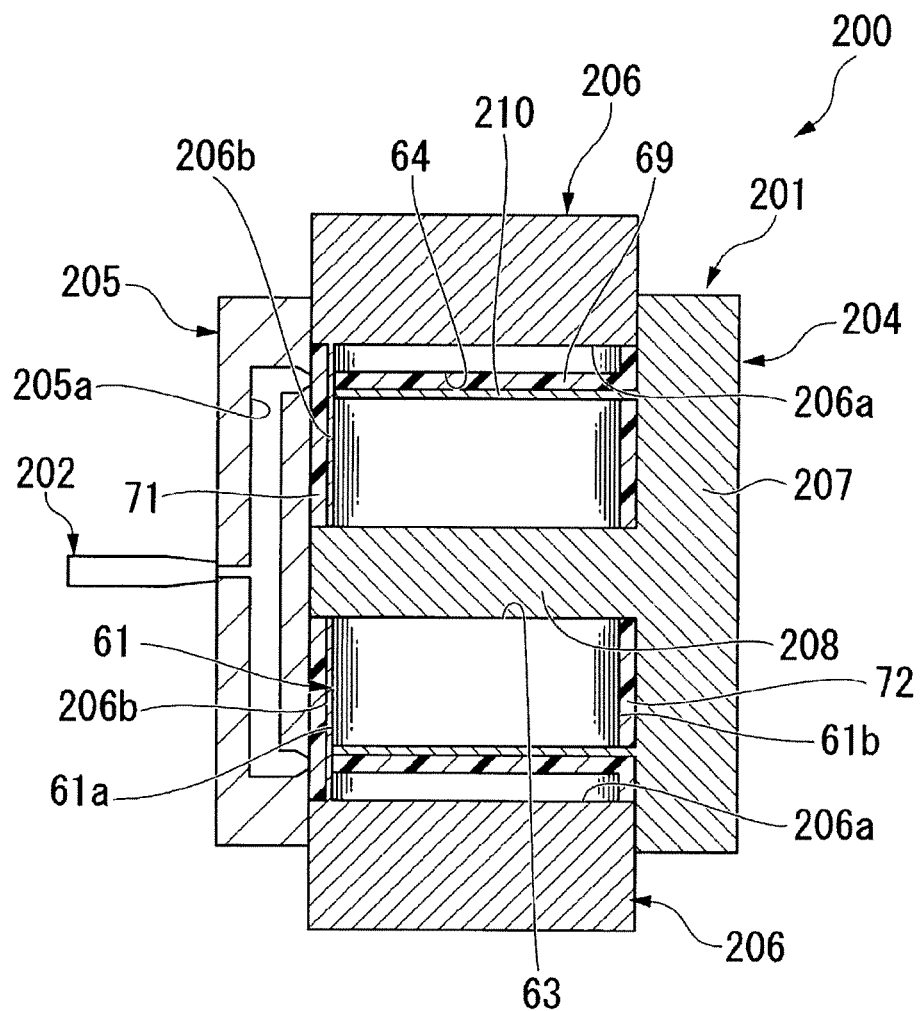
FIG. 11 is a diagram illustrating the process of manufacturing the rotor according to the modified example of the embodiment.

Then, the injection step is performed. As illustrated in FIG. 11, in the injection step, a heated and softened bond magnet is injected into the mold 201 in which the rotor core 61 is set. The bond magnet is injected from the injection nozzle 202 and is filled in the mold 201 via the flow channel 205a of the infilling mold 205. The bond magnet filled in a space surrounded with the infilling mold 205, the slide core molds 206, and the first end face 61a of the rotor core 61 forms the first end plate 71. The bond magnet filled in the slots 64 forms the rotor magnets 69. The bond magnet filled in a space surrounded with the base portion 207 of the base mold 204, the slide core molds 206, and the second end face 61b of the rotor core 61 forms the second end plate 72.

Figure 12:
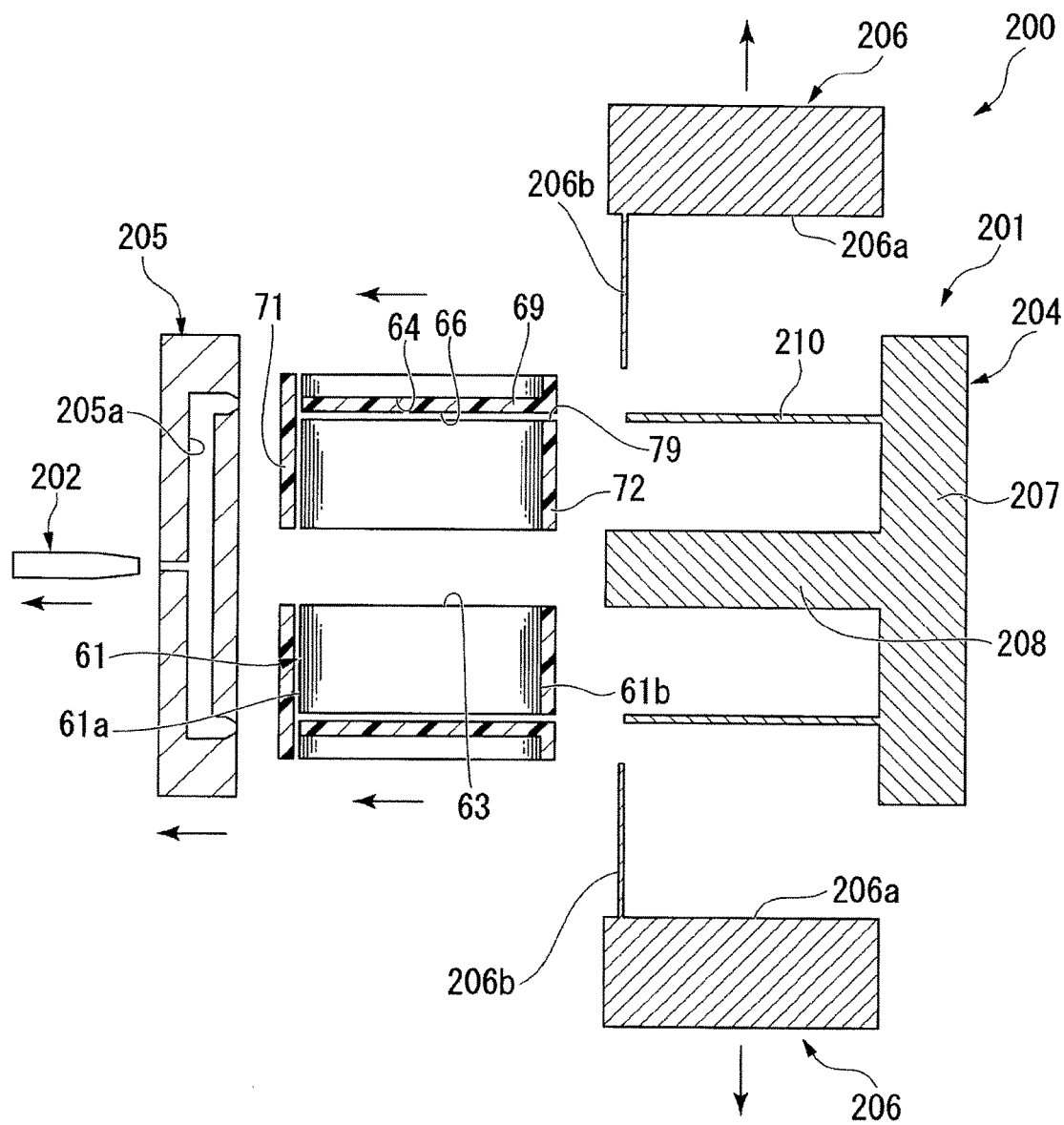
FIG. 12 is a diagram illustrating the process of manufacturing the rotor according to the modified example of the embodiment.

Then, the pin drawing step is performed. In the pin drawing step, first, the bond magnet filled in the mold 201 is cooled and solidified. Subsequently, as illustrated in FIG. 12, the infilling mold 205 is moved to be separated from the base mold 204. The slide core molds 206 are moved to the outside in the radial direction to draw out the end pins 206b. The rotor core 61 integrated with the bond magnet is taken out of the base mold 204 to draw out the slot pins 210. Accordingly, in the solidified bond magnet, drawing holes 90 extending from the inner circumferential surface to the outer circumferential surface in the radial direction are formed in the parts which are located on one side in the axial direction of the rotor core 61. In the solidified bond magnet, the above-mentioned slot flow channels 66 extending in the axial direction are formed in the slots 64. In the solidified bond magnet, the above-mentioned through-holes 79 penetrating in the axial direction are formed in the parts which are located on the other side in the axial direction of the rotor core 61.

Figure 13:
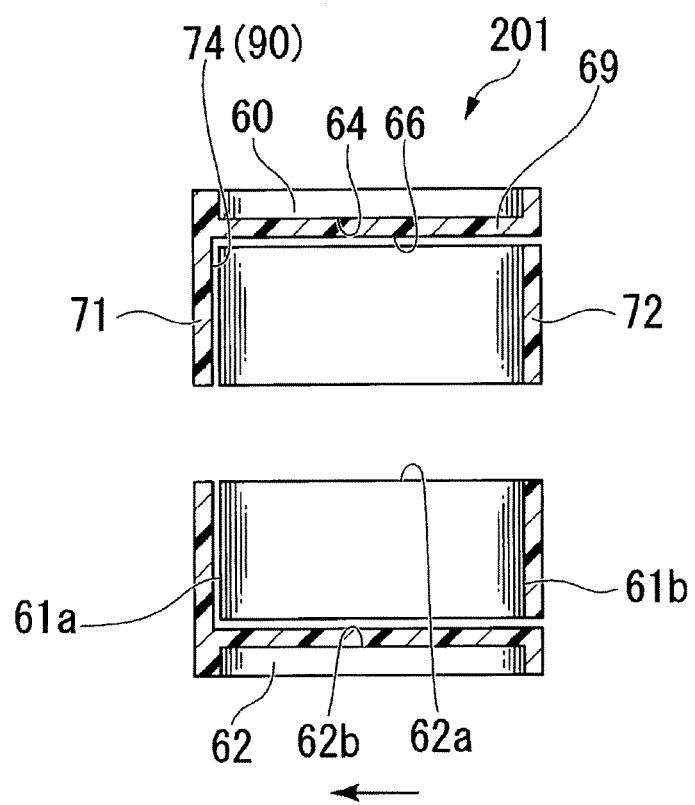
FIG. 13 is a diagram illustrating the process of manufacturing the rotor according to the modified example of the embodiment.

Then, the sealing step is performed. As illustrated in FIG. 13, in the sealing step, parts located on the outside in the radial direction of the slot flow channels 66 among the drawing holes 90 formed by drawing out the end pins 206b in the pin drawing step are sealed. The drawing holes 90 are filled and sealed with the bond magnet. Accordingly, the above-mentioned end flow channels 74 are formed. In addition, the first end plate 71, the second end plate 72, and the rotor magnets 69 are formed.

Finally, the magnetization step is performed. In the magnetization step, the rotor magnets 69 are magnetized such that the magnetization directions of the rotor magnets 69 alternate in the circumferential direction.

In this way, manufacturing of the rotor 121 is completed.

In this way, according to the rotor 121 according to the modified example, since the slot flow channels 66 in which a refrigerant can flow are disposed between the rotor magnets 69 and the rotor core 61, the rotor magnets 69 can be directly cooled by causing a refrigerant to flow in the slot flow channels 66. Accordingly, it is possible to prevent demagnetization of the rotor magnets 69. As a result, it is possible to prevent a decrease in efficiency of the motor 23.

In addition, since the end flow channels 74 in which a refrigerant can flow are disposed between the first end plate 71 and the rotor core 61, the first end plate 71 can be cooled by causing the refrigerant to flow in the end flow channels 74. Accordingly, even when the first end plate 71 along with the rotor magnets 69 disposed in the rotor core 61 is magnetized, it is possible to prevent demagnetization of the first end plate 71. As a result, it is possible to prevent a decrease in efficiency of the motor 23.

In addition, the method of manufacturing the rotor 121 according to the modified example includes the slot pin arranging step of inserting the slot pins 210 into the inner surfaces of the slots 64, the end pin arranging step of arranging the end pins 206b on the first end face 61a of the rotor core 61, the injection step of injecting a bond magnet into the mold 201, and the pin drawing step of drawing out the slot pins 210 and the end pins 206b to form the slot flow channels 66 and the end flow channels 74 in which a refrigerant can flow.

According to this method, the flow channels (the slot flow channels 66 and the end flow channels 74) for allowing a refrigerant to flow can be easily formed in the slots 64 and on the first end face 61a of the rotor core 61. Accordingly, since the rotor magnets 69 disposed in the slots 64 or the first end plate 71 can be cooled, it is possible to prevent demagnetization of the rotor magnet 69 or the first end plate 71. As a result, it is possible to manufacture the rotor 121 that can prevent a decrease in efficiency of the motor 23.

Furthermore, in the modified example, the end flow channels 74 are formed on the first end plate 71, but the disclosure is not limited thereto and the end flow channels may be formed on the second end plate 72. The end flow channels of the first end plate 71 and the end flow channels of the second end plate 72 may be arranged alternately in the circumferential direction.

In addition, in the modified example, the parts of the drawing holes 90 are filled and sealed with the bond magnet in the sealing step, but the disclosure is not limited thereto and the parts of the drawing holes may be sealed, for example, using a resin material or an adhesive.

In addition, in the injection machine 200 which is used in the manufacturing method according to the modified example, the slot pins 210 are formed in the base mold 204, but the disclosure is not limited thereto and the slot pins may be formed in the infilling mold 205.

Furthermore, the disclosure is not limited to the above-mentioned embodiment which has been described with reference to the drawings, but various modified examples thereof can be considered within the technical scope thereof.

For example, in the embodiment, both the first end plate 71 and the second end plate 72 are formed of the bond magnet, but the disclosure is not limited thereto. Only one of the first end plate and the second end plate may be formed of the bond magnet.

In addition, in the embodiment, the rotor magnets 69 disposed in the slots 64 are formed of the bond magnet, but the disclosure is not limited thereto. The rotor magnets may be formed of a sintered magnet not including a resin material.

In addition, in the embodiment, the recessed portions 76 are formed in the second end plate 72, but the disclosure is not limited thereto. The recessed portions may be formed on the principal surface of the first end plate 71 facing the opposite side of the rotor core 61. In addition, no recessed portion may be formed in any of the first end plate 71 and the second end plate 72.

In addition, in the embodiment, the disclosure is applied to an inner rotor type motor as a rotary electric machine, but the disclosure is not limited thereto. The disclosure may be applied to an outer rotor type motor. Additionally, the rotary electric machine is not limited to the motor for an automobile, but a motor or a generator for other applications may be used.

Without departing from the gist of the disclosure, elements in the embodiment may be appropriately substituted with known elements.

What is claimed is:

1. A method of manufacturing a rotor of a rotary electric machine, in which the rotor of the rotary electric machine comprises: a rotary shaft; a rotor core that is fixed coaxially to the rotary shaft and formed of an electromagnetic steel; and an end plate that is formed of a bond magnet and disposed to face an end face of the rotor core, the method of manufacturing the rotor of the rotary electric machine comprising:

a slot pin arranging step of arranging a slot pin on an inner surface of a slot formed in the rotor core;

an end pin arranging step of arranging an end pin extending in a radial direction on the end face of the rotor core;

an injection step of injecting a bond magnet into a mold in which the rotor core is set; and a pin drawing step of drawing out the slot pin and the end pin to form a flow channel in which a refrigerant flows.

* * * * *